Nov. 20, 1945.  E. C. GRAVES  2,389,193
SUPPLEMENTAL FEED FOR DRAPERS
Filed Aug. 18, 1944
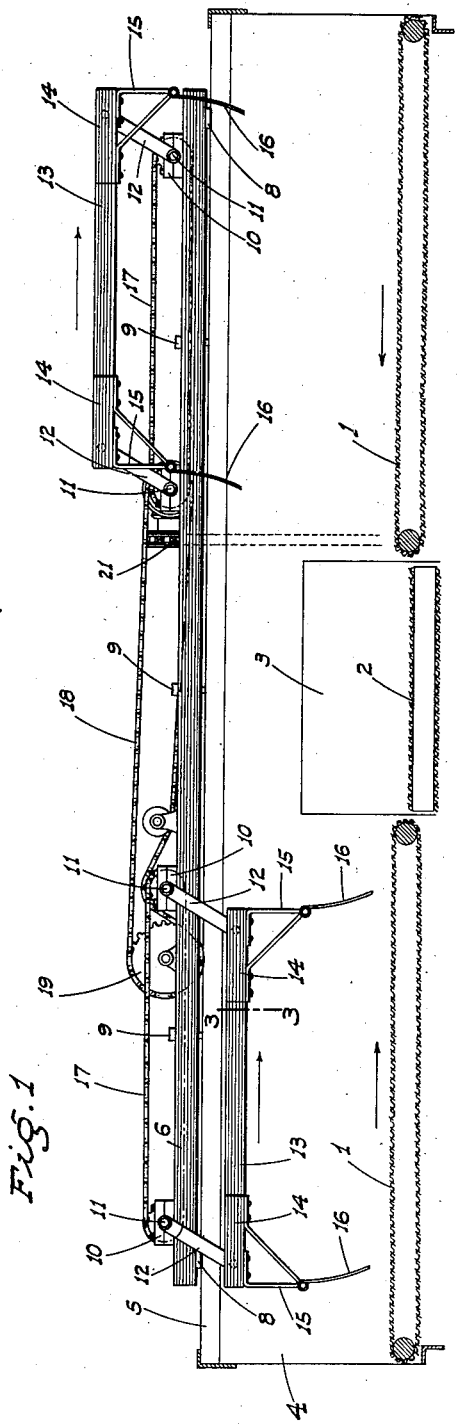
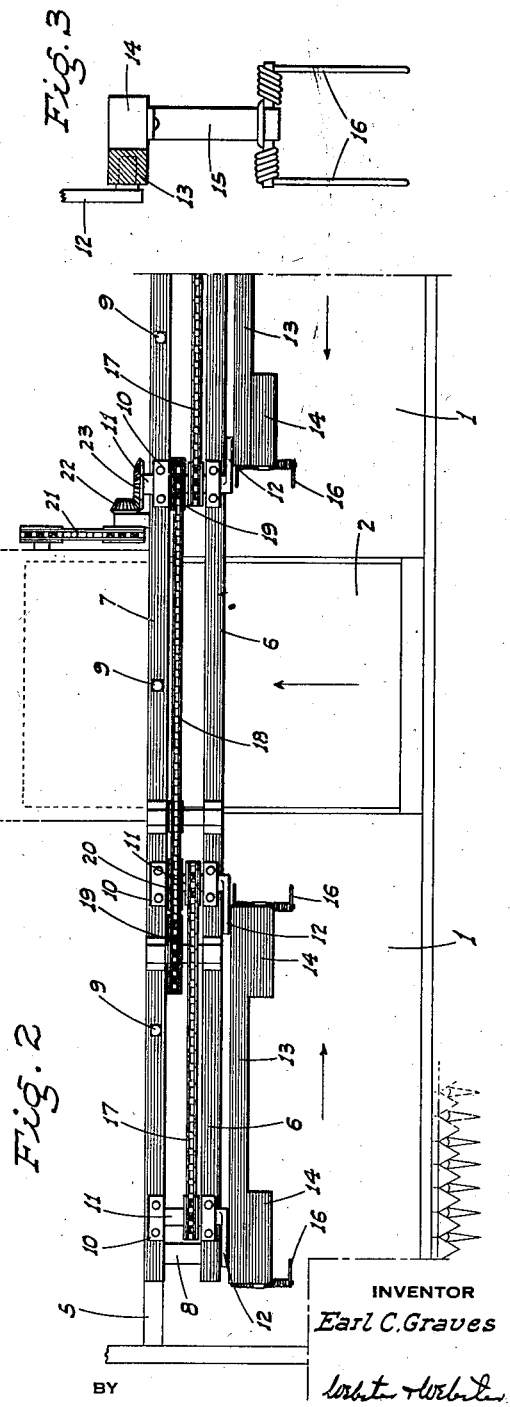
INVENTOR
*Earl C. Graves*
BY
ATTORNEYS Patented Nov. 20, 1945

2,389,193

UNITED STATES PATENT OFFICE 2,389,193

SUPPLEMENTAL FEED FOR DRAPERS

Earl C. Graves, Trowbridge, Calif.

Application August 18, 1944, Serial No. 550,019

2 Claims. (Cl. 198—166)

This invention relates to harvesters, and particularly to the feeding of the cut grain from the platform drapers to the threshing mechanism.

As the drapers are now arranged the grain frequently tends to temporarily clog or pile thereon, resulting in an uneven choking feed to the threshing mechanism.

The principal object of my invention is to eliminate this undesirable action by the provision of a supplemental feed device which insures a regular and even flow of the grain from the drapers to the threshing mechanism and moves the grain away from the divider boards. As a result there is no tendency to choke the threshing cylinder, and improved and more efficient threshing is obtained.

Another object is to provide a device for the purpose which may be readily attached to a standard harvester with a minimum of work.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a front elevation of my improved supplemental feed device as mounted in connection with the platform drapers of a center-feed harvester.

Figure 2 is a top plan view of the same.

Figure 3 is a fragmentary cross section on the line 3—3 of Fig. 1.

Referring now more particularly to the characters of reference on the drawing, the harvester to which the supplemental feed device is applied is here shown as being of the center-feed cross conveyor type of platform, which includes laterally extending platform drapers 1 feeding toward each other and onto a central cross conveyor 2. This cross conveyor extends into an opening 3 leading to the threshing mechanism and formed in the upstanding back-board 4, which has a rigid frame beam 5 along its upper edge. This arrangement is standard in a certain make of harvester, and I do not change the same in any way in applying my supplemental feed device thereto.

Said feed device comprises a pair of parallel front and back frame beams 6 and 7, respectively, disposed on a common level and connected by suitably disposed tie bars 8. The back beam 7 is secured on the beam 5 by bolts 9 or the like, thus leaving the beam 6 in overhanging relation to the harvester platform.

Bearing boxes 10 mounted in pairs on the beams 6 and 7 support turnable shafts 11, each pair of shafts overhanging the drapers 1 and being spaced relatively far apart. Crank arms 12 project radially from the shafts, each pair of arms being parallel and being pivotally connected to a bar 13 in front of the beam 6. End blocks 14 are secured on the bar in front of the same and at their opposite ends these blocks support depending brackets 15 which in turn support a pair of depending spring fingers 16 disposed transversely of the drapers 1. The length of the fingers is such that when the crank arms are in a vertical depending position, the fingers are close to but clear of the drapers 1.

The two bars 13 and the attached fingers are moved toward each other as the respective crank arms turn on their down stroke, and in the same direction and at the speed of the drapers 1, but also in alternating order to each other, by the following drive mechanism:

Separate endless chain drives 17 connect the shafts 11 of each pair, while the adjacent shafts 11 of the pairs are connected by a chain drive 18 which includes end sprockets 19, one only of which is fixed on one of the shafts 11; and another sprocket 20 on the other shaft 11 over which the lower run of the chain of said drive passes, as shown in Fig. 1, so that said shafts 11 will be rotated in opposite directions.

One shaft 11 is driven from a suitable driven member on the harvester (such as the cross conveyor 2) at the proper speed and in the proper direction by means of a chain drive 21 connecting said conveyor with a bevel pinion 22 mounted on the beam 7 and meshing with a bevel gear 23 fixed with said shaft 11, as shown in Fig. 2.

The bars 13 are arranged in opposed relation as shown so as to counterbalance each other, and so that only one set of fingers 16 at a time is functioning to assist the movement of the grain along the corresponding draper and onto the cross conveyor. The grain piling up on each draper 1 is thus intermittently acted on by the feed fingers of the corresponding bar 13 in alternating order to the feeding of the grain from the other draper 1.

Although I have here shown the device as mounted in connection with a harvester platform of a certain specific type, the device may also be used, with certain obvious modifications, in connection with the platform draper arrangements of other types of harvester.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A supplemental feed device for a pair of horizontal drapers spaced apart horizontally and feeding toward each other, said device comprising a horizontal frame beam mounted above and extending along both drapers in overhanging relation thereto, a pair of horizontal bars, one for each draper, in front of the beam, feed fingers depending from each bar, a pair of parallel crank arms connected to each bar and supported for rotation from the beam, and an operating mechanism to rotate the cranks so that on the down stroke of the cranks the bars will travel in the same direction as the corresponding drapers said mechanism being so relatively arranged that when one bar is at its top most position the other bar is at its lower most position.

2. A self-contained supplemental feed device for attachment to the upstanding back board of a harvester having a pair of horizontal drapers spaced apart and feeding toward each other; such device comprising a pair of parallel beams spaced laterally apart and being rigidly interconnected, one of said beams being provided with means for attaching it to the top edge of the back board of the harvester with the other beam overhanging the draper, a pair of spaced shafts journaled at each end of the beams and extending transversely across the space between the beams, a sprocket on each shaft, a drive chain about the sprockets of each pair of shafts, a crank arm on the outer end of each shaft, a bar journaled on each pair of crank arms, feed fingers depending from each bar, a second sprocket on each inner shaft of each pair of shafts, an additional shaft journaled on said beams adjacent one of such inner shafts, a sprocket on said additional shaft, a drive chain mounted around the sprocket on such additional shaft and around the second sprocket on the one of said inner shafts which is most remote from such additional shaft, the lower run of such last named chain running over the second sprocket on the one of said inner shafts which is adjacent to the additional shaft, and a drive gear on the end of one of said shafts.

EARL C. GRAVES.